United States Patent [19]

Long

[11] 4,385,958

[45] May 31, 1983

[54] LABEL CASSETTE AND SYSTEM FOR MOUNTING SAME

[75] Inventor: George R. Long, Newark, Del.

[73] Assignee: E. I. Du Pont de Nemours and Company, Wilmington, Del.

[21] Appl. No.: 290,496

[22] Filed: Aug. 6, 1981

[51] Int. Cl.$^3$ .................... G03B 23/02

[52] U.S. Cl. .................... 156/361; 156/384; 156/584; 206/387; 221/73; 242/197; 352/78 C

[58] Field of Search .................... 242/197–199; 206/387; 221/73; 156/384, 542, 584, 361, 540–541; 352/78 R, 78 C, 72

[56] References Cited

U.S. PATENT DOCUMENTS

| | | | |
|---|---|---|---|
| 3,768,392 | 1/1973 | Gardella et al. | 352/72 X |
| 3,801,408 | 4/1974 | Kuring et al. | 156/552 |
| 3,918,801 | 11/1975 | Bauhofer | 352/78 C X |
| 3,944,455 | 3/1976 | French | 156/361 |
| 3,997,384 | 12/1976 | Kuring et al. | 156/269 |
| 4,048,494 | 9/1977 | Liesting | 250/223 R |
| 4,145,966 | 3/1979 | Peterson et al. | 101/260 |
| 4,264,396 | 4/1981 | Stewart | 156/361 |

*Primary Examiner*—David A. Simmons

[57] ABSTRACT

A label cassette is described in which labels releasably adhered to a support strip are stored in a cassette. The cassette is generally rectangular with one corner formed at approximately a 45° angle. A reflective surface is placed on the angular corner to permit a light beam to be reflected from the cassette through holes in the support strip between each label to control the advance of the support strip into the label printer. With this arrangement the proper positioning of the label cassette as well as that of the support strip are simultaneously detected.

4 Claims, 3 Drawing Figures

LABEL CASSETTE AND SYSTEM FOR MOUNTING SAME

BACKGROUND OF THE INVENTION

Automatic label dispensers are being used more and more. One area of use is in supermarkets where prices are imprinted on a label and applied to the merchandise by an automatic hand held labelling machine. One machine of this type is described in U.S. Pat. No. 4,264,396 issued to Stewart. In this machine, labels releasably adhered to a support strip are stored in a cassette from which they are dispensed to a thermal printer as needed. Dot indicia are placed on the support strip between each label to be detected by a photocell and thereby control the incremental advance of each label to the printer.

Unfortunately, if the dot formed on the substrate between each label is not of uniform density or if there are skips, the positioning of each label may not always be positively achieved. Also, if the cassette is not placed securely in its receptacle in the printer mechanism, the labels can become somewhat skewed, again creating problems. In extreme cases, the skewing, because of an improperly seated cassette, can cause the label advance to jam.

The label dispensing system described in U.S. Pat. No. 3,997,384, which senses the differences in reflectivity between a label and the label substrate, suffers from similar disadvantages.

In another label printing system, such as that described in U.S. Pat. No. 4,048,494, the label advance is controlled by passing a light beam directly through a transparent substrate. In this manner the proper advance of each label to the print area is controlled. This system suffers from many of the same disadvantages as those discussed above. If the cassette is not in the proper position the support strip can become skewed causing undue friction. Also, if the optical density of the support strip varies or becomes marked, a false label detection can occur.

SUMMARY OF THE INVENTION

According to this invention a cassette for holding a roll of labels releasably adhered to a support strip having position locator openings between each label, is contructed. The cassette is adapted to supply the support strip (with labels) to a printer for label imprintation. The printer has a rectangular shaped receptacle for receiving the cassette and the receptacle has an optical sensor for sensing label position by directing a beam of radiant energy toward the cassette and a detector for radiant energy positioned transversely of the beam to receive radiant energy reflected from the cassette, and means responsive to the detector for advancing the support strip for label imprintation.

The cassette has a shell-like housing with a bottom wall and enclosing side walls for retaining the roll of labels, a shaped exit slot on one side wall for directing the support strip along the one side wall toward one corner of the cassette, the one corner defining a surface reflective of radiant energy transversely disposed relative to the one side wall, and a cover wall to enclose the shell-like housing.

In a preferred embodiment of the invention, both the cover and bottom walls define a hub for mounting the label roll. A reflective strip may be adhered to the transversely disposed surface. The rectangular receptacle is defined by first and second corner brackets, the second corner bracket defining a guide groove for guiding a support strip to the printer and an opening for permitting reflected radiant energy to pass from the reflective surface through the label position locator openings in the support strip to the detector, the detector being located adjacent the guide groove at the opening.

With this construction, the beam of radiant energy, light, passes through the guide groove opening and the support strip, impinges upon the corner of the cassette and is reflected horizontally (in the drawing) to a radiant energy detector. In this manner not only must the cassette be in position for the system to operate but the cassette must be properly in position. If it skewed or not all the way in its receptacle the reflective light path is broken and the system is inoperative. Furthermore, the beam must pass directly through holes formed within the support strip. This is a very positive system of a go or no-go variety in which no subtle variations in density are relied upon for proper advance control of the individual labels.

BRIEF DESCRIPTION OF THE DRAWINGS

Further advantages and features of this invention will become apparent from the following description in conjunction with the drawings in which.

DETAILED DESCRIPTION OF THE PREFERRED EMBODIMENT

In patient identification and other like systems using labels it is necessary to provide a suitable supply of labels that can be imprinted with the desired information. It is customary to place a roll of labels releasably adhered to a support strip into a dispensing cassette for use with the appropriate printing equipment. This printing equipment may, for example, be a label printer such as described in Long et al., U.S. Pat. No. 4,268,179, or label printers of the type described in U.S. Pat. No. 4,048,494 or U.S. Pat. No. 4,264,396. The Long et al. system produces identification characters that are both human and machine readable. The identification characters, such as those on a patient's I.D. bracelet or an inventory control tag or label, are scanned with an optical character reader. The character information obtained from the reader is processed and used to control the reproduction of the identification characters using a dot matrix thermal printer. Long et al. enhance the readability of the characters by increasing the heat applied by the thermal printer to the thermal paper. This increases the dot area and radiation absorbance to produce an apparent solid line character which is more easily readable by an optical character reader.

Figure 1:
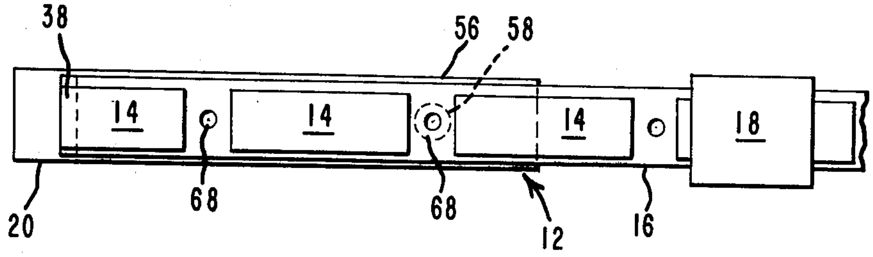
FIG. 1 is a part elevation, part block diagram of a cassette, constructed in accordance with this invention, positioned in a label printing system.
Figure 2:
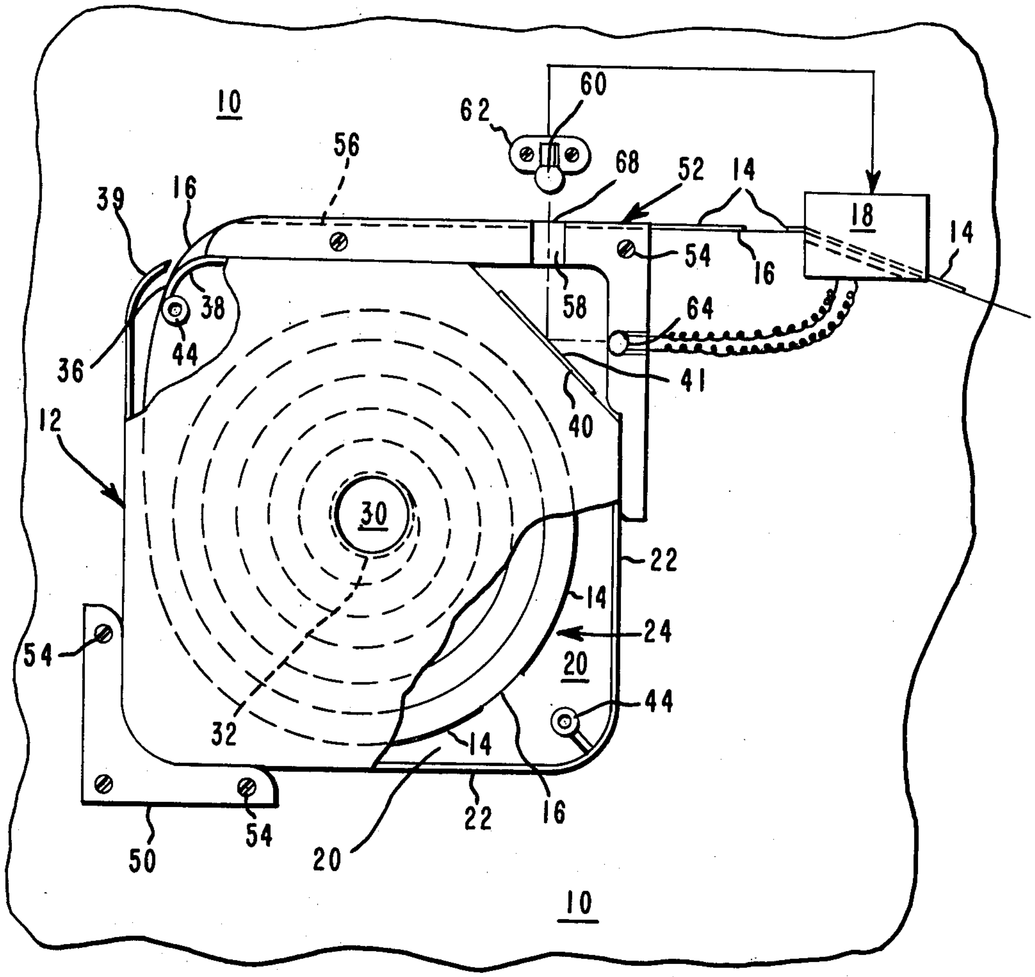
FIG. 2 is a plan view of the cassette and its mounting bracket, depicted in FIG. 1, constructed in accordance with this invention.

A typical system for this purpose includes an entire label dispenser printer unit only a portion of which is seen as being mounted on a frame 10 in FIG. 1. A label supply cassette, constructed in accordance with this invention, is depicted at 12. The cassette dispenses labels 14 releasably adhered to a support strip 16. In accordance with this invention, the support strip is formed with holes 68 in the support strip between each label 14. The support strip 16 is passed onto a label printer depicted generally by bock 18. The block 18 may be a typical impact printer of conventional design or a thermal printer of the type described in the Long patent or U.S. Pat. No. 4,264,396. The imprinted labels exit from the printer 18. The support strip is removed from the labels, or vice versa, either manually or by bending the support strip, as is well known, around a sharp corner such that it is separated from the label. The printer preferably includes a drive motor, such as that described in the Long et al. patent, for advancing the support strip automatically under the control of a label position sensor of the type described above.

Figure 3:
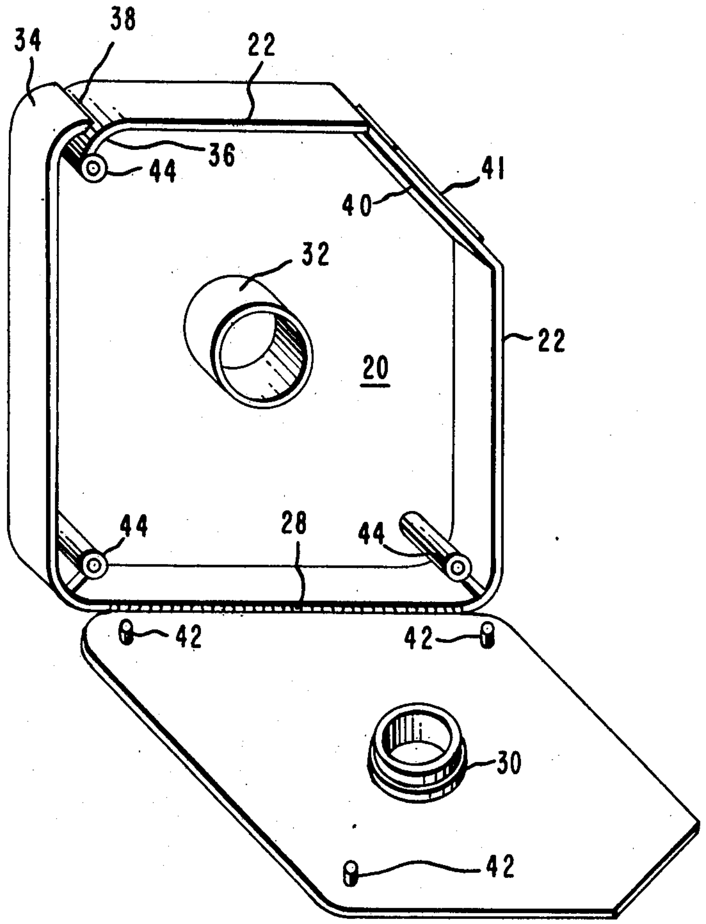
FIG. 3 is a pictorial representation of the cassette of FIG. 2 in an open position.

The present invention improves such prior systems by providing an improved label cassette 12 which may be molded of a suitable engineering plastic and is generally rectangular in configuration. The cassette 12 has a bottom wall 20 and side walls 22 which cooperate with the bottom wall to enclose an interior area adapted to retain a roll of detachable labels 24 as described. A cover 26, attached by a living hinge 28 (FIG. 3) to one of the side walls, completes the assembly for enclosing the roll 24 within the cassette. The cover 26 may have a hollow stud 30 formed thereon adapted to fit within a hub 32 formed on the bottom wall 20.

Preferably, the corners of the cassette 12 are generally rounded. An exit slot 38 is formed in the side wall 22 adjacent (upper left in the drawing) one corner 34. A shaped surface 36 is formed at the exit slot 38 to direct the support strip 16 through the exit slot 38 to permit the support strip to be withdrawn. The opening 38 is in the upper side wall 22. This side wall is foreshortened to form the shaped surface 36. This side wall also is foreshortened at the opposite (upper right in the drawing) corner to define an angled corner 40. The surface forming this corner 40 is at a generally 45° angle with respect to the side walls 22 and either is painted or has a reflective surface adhered thereto such that light or other radiant energy may be reflected therefrom. Typically a white paint may be used to provide suitable reflectivity although a mirror type surface is preferred. For this purpose aluminum tape having an adherent backing may be used.

The cassette 12 may be provided with suitable locking catches such as provided by the male studs 42 and the female receptacle 44. These generally may be provided at the three corners of the cassette.

Further, in accordance with this invention, the cassette 12 is adapted to be placed in a rectangular receptacle formed on the mount 10 by a pair of corner brackets 50 and 52. The brackets are secured to the mount 10 as by suitable screws 54. The upper bracket in the drawing 52 is extended in the horizontal direction to cover most of the upper side wall 22 of the cassette 12. The bracket is formed such that its upper surface has a groove of a width suitable for receiving the support strip 16 and guiding it past an opening or orifice 58 formed in the bracket. Light from a light source 60, secured as by a suitable bracket 62 to the mount 10, is adapted to pass downwardly through the orifice 58. Power for the light source 60 is supplied from a suitable source typically depicted as the block 18 which is the location of the printer. Any battery or power source may serve for this purpose.

Light from the light source 60 is passed downwardly in the drawing to be reflected from the angled surface 40 to a photocell or other suitable radiant energy detector 64 positioned in the mounting bracket 52. The resulting electrical signal from the detector 64 is passed to the printer to control the advance of the support strip with the labels thereon. A reflective strip 41 may be placed on the surface 40 and may be narrow so that if the cassette is not properly positioned, no light is reflected.

The printer logic circuitry is conventional and of the type described by Long et al., U.S. Pat. No. 4,264,396 or U.S. Pat. No. 3,997,384. Preferably these prior systems are modified such that an initial signal from the photocell 60 is required to prime the substrate advance control gate. This gate (not shown) may be a two input AND gate which initiates the substrate advance when a substrate advance and print signal is received. Using the unique cassette of this invention, if the cassette is not properly positioned, no prime signal is received. Unless so primed by the photocell signal, the gate will not permit the advance of the substrate for the next printing cycle. The substrate continues to advance until a second signal is received from the photocell indicating the next hole 68 is over the orifice 68 and light is again striking the photocell. The second signal stops the substrate advance and the advance gate is again primed awaiting the next advance and print signal.

In operation, a cassette 12 with a roll 24 of labels therein is positioned within the rectangular receptacle formed by the brackets 50 and 52. The support strip 16 with the labels 14 thereon is fed through the groove 56 to the label printer 18 and advanced until one of the holes 68 in the support strip is in alignment with the opening 58. When the operator desires to print a new label, he actuates the printer 18 as described. Any of the known control systems, such as that described by Long et al., may be used for this purpose. The printing may continue until the light path, established from the lamp 60 through the next hole 68 and the orifice 58 is reflected off the angular surface to the photocell, is again established. The re-establishment of the light path is detected and the drive motor of the printer stopped to await the next label print signal.

The advantages of this particular system are many; for one, if the cassette is improperly positioned within the receptacle, the light path is not completed and the system is rendered inoperative by the simple logic of not permitting the printer to operate or the substrate to advance unless and until its initial condition is that of a light path having been established. Furthermore, the uncertainties of the prior transmission through transparent tape systems and those depending upon varying reflectivities of the support strip are virtually eliminated. The system is relatively fool-proof and quite reliable in its operation.

I claim:

1. A cassette for holding a roll of labels releasably adhered to a support strip with position locator openings in the strip between each label, the cassette adapted to supply the support strip to a printer for label imprintation, the printer having a receptacle for receiving the cassette, the receptacle having a sensor for sensing label position by directing a beam of radiant energy toward the cassette and a detector for radiant energy positioned transversely of the beam, and means responsive to the detector for advancing the support strip for label imprintation, said cassette having:

a shell-like housing with a bottom wall and enclosing side walls for retaining the roll of labels, a shaped exit slot on one side wall for directing the support strip along the one side wall toward one corner of the cassette, the one corner defining a surface reflective of radiant energy, the surface transversely disposed relative to the one side wall, and said radiant energy passing from said beam to said detector through a position locator opening in the strip only when the cassette is properly positioned in the receptacle, and a cover wall to enclose the shell-like housing.

2. The cassette of claim 1 wherein the cover and bottom walls define a hub for mounting the label roll.

3. The cassette of claim 1 or 2 wherein a reflective strip is adhered to the transverse surface.

4. A cassette for holding a roll of lables releasably adhered to a support strip with position locator openings in the strip between each label, the cassette adapted to supply the support strip to a printer for label imprintation, the printer having a receptacle for receiving the cassette, the receptacle having a sensor for sensing label position by directing a beam of radiant energy toward the cassette and a detector for radiant energy positioned transversely of the beam, and means responsive to the detector for advancing the support strip for label imprintation, said cassette having:

a shell-like housing with a bottom wall and enclosing side walls for retaining the roll of labels, a shaped exit slot on one side wall for directing the support strip along the one side wall toward one corner of the cassette, the one corner defining a surface reflective of radiant energy, the surface transversely disposed relative to the one side wall, and said radiant energy passing from said beam to said detector through a position locator opening in the strip only when the cassette is properly positioned in the receptacle, a cover wall to enclose the shell-like housing, said receptacle being defined by first and second corner brackets, the second corner bracket defining a guide groove for guiding the support strip to the printer and an opening for permitting the beam of radiant energy to pass to the detector through the label position locator openings via the reflective surface.

* * * * *